US012572196B2

(12) United States Patent
Thomas et al.

(10) Patent No.: US 12,572,196 B2
(45) Date of Patent: Mar. 10, 2026

(54) MANAGING AN INDUSTRIAL ENVIRONMENT HAVING MACHINERY OPERATED BY REMOTE WORKERS AND PHYSICALLY PRESENT WORKERS

(71) Applicant: International Business Machines Corporation, Armonk, NY (US)

(72) Inventors: Binoy Thomas, Kozhikode (IN);
Sarbajit K. Rakshit, Kolkata (IN);
Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 18/427,878

(22) Filed: Jan. 31, 2024

(65) Prior Publication Data

US 2025/0244821 A1     Jul. 31, 2025

(51) Int. Cl.
G06F 3/01 (2006.01)
G05B 15/02 (2006.01)

(52) U.S. Cl.
CPC ............. G06F 3/011 (2013.01); G05B 15/02 (2013.01)

(58) Field of Classification Search
CPC ........ G06F 3/011; G05B 15/02; G06T 19/006
See application file for complete search history.

(56) References Cited

U.S. PATENT DOCUMENTS 8,355,818 B2 * 1/2013 Nielsen ................ G05D 1/0214
                                           700/258
10,824,142 B2 * 11/2020 Menon ................ G05D 1/0088

11,675,350 B2   6/2023 Menon et al.
2010/0271394 A1 * 10/2010 Howard ................. G06F 3/011
                                           345/633
2015/0339453 A1 * 11/2015 Richards ............... G16H 40/67
                                           345/633

(Continued)

FOREIGN PATENT DOCUMENTS

EP        3746854 A1   12/2020
JP      2003044612 A    2/2003
WO     2019180700 A1    9/2019

OTHER PUBLICATIONS

De Pace, Francesco, "A Comparison Between Two Different Approaches for a Collaborative Mixed-Virtual Environment in Industrial Maintenance", Mar. 2019, Frontiers, vol. 6, pp. 1-14 (Year: 2019).*

(Continued)

*Primary Examiner* — Terrell M Robinson
(74) *Attorney, Agent, or Firm* — Cantor Colburn LLP; Stephen Yoder

(57) ABSTRACT

Computer-implemented methods for managing an industrial environment having machinery operated by remote workers and physically present workers are provided. Aspects include identifying a first area of the industrial environment suitable for a presence of physically present workers and identifying a second area of the industrial environment that is not suitable for the presence of physically present workers. Aspects also include configuring machinery disposed in the second area of the industrial environment to be operated by remote workers and displaying, via an augmented reality display to the physically present workers, avatars of the remote workers operating machinery disposed in the second area.

20 Claims, 6 Drawing Sheets

(56)                    References Cited

U.S. PATENT DOCUMENTS

| | | | | |
|---|---|---|---|---|
| 2016/0132046 | A1* | 5/2016 | Beoughter | G06F 16/248 |
| | | | | 700/17 |
| 2017/0148214 | A1* | 5/2017 | Muniz-Simas | A61B 5/165 |
| 2017/0326457 | A1 | 11/2017 | Tilton et al. | |
| 2018/0131907 | A1* | 5/2018 | Schmirler | G05B 23/0216 |
| 2019/0147655 | A1* | 5/2019 | Galera | G06T 15/20 |
| | | | | 345/419 |

OTHER PUBLICATIONS

Hussain, Ali, "Metaverse in Manufacturing Using Emerging Technologies: An Overview for the Smart Industry 4.0", Oct. 2023, IEEE, pp. 1-6 (Year: 2023).*

Adami et al., "An Immersive Virtual Learning Environment for Worker-Robot Collaboration on Construction Sites," Proceedings of the 2020 Winter Simulation Conference, 2020, 12 pages.

Aditya et al., "A Survey on Blockchain in Robotics: Issues, Opportunities, Challenges and Future Directions," Journal of Network and Computer Applications, vol. 196, Dec. 15, 2021, 87 pages.

Anonymous, "Method and system for context aware infrastructure deployment in industrial floor for required level of avatar-based guidance," IP.com No. IPCOM000272616D, Jun. 29, 2023, 6 pages.

Anonymous, "Method and System for Remote Collaboration Using Wearable Robots in a Hybrid Working Environment," IP.com No. IPCOM000271366D, Dec. 1, 2022, 4 pages.

Caiza et al., "Flexible robotic teleoperation architecture for intelligent oil fields," Heliyon 6, 2020, pp. 1-13.

Jeelani et al., "Improving Safety Performance in Construction Using Eye-Tracking, Visual Data, Analytics, and Virtual Reality," Construction Research Congress 2020, pp. 395-404.

Lopes et al., "Controlling Robots using Artificial Intelligence and a Consortium Blockchain," arXiv:1903.006600v1 [cs.RO] Mar. 2, 2019, 16 pages.

Lopes et al., "Robot Workspace Monitoring Using a Blockchain-Based 3D Vision Approach," ResearchGate, Jun. 2019, 10 pages.

Wang et al., "BeHere: a VR/SAR remote collaboration system based on virtual replicas sharing gesture and avatar in a procedural task," Virtual Reality, No. 27, 2023, pp. 1409-1430.

Xu et al., "Incorporating Virtual Reality Technology in Safety Training Solution for Construction Site of Urban Cities," Sustainability, vol. 13, No. 243, 2021, pp. 1-19.

Unknown, "5 Ways to Use Augmented Reality in Manufacturing", Retrieved from: https://pixelplex.io/blog/ augmented-reality-in-manufacturing/, Mar. 1, 2023, 20 pages.

Unknown, "Ar and VR in the workplace", Retrieved from: https://web.archive. org/web/20210225065259/https:// www.IBM.com/thought-leadership/institute-business-value/report/ar-vr-workplace, Retrieved on: Feb. 25, 2021, 5 pages.

Unknown, "Inventing What's Next", Retrieved from: https://web.archive.org/web/20230208013840/https://research. IBM.com/, Retrieved on: Feb. 8, 2023, 13 pages.

Unknown, "Maximo mobile enterprise asset management (EAM) products", Retrieved from: https://web.archive.org/ web/20210208162003/https://www.IBM.com/products/maximo/mobile-eam, Retrieved on: Feb. 8, 2021, 10 pages.

\* cited by examiner

100 ⟍

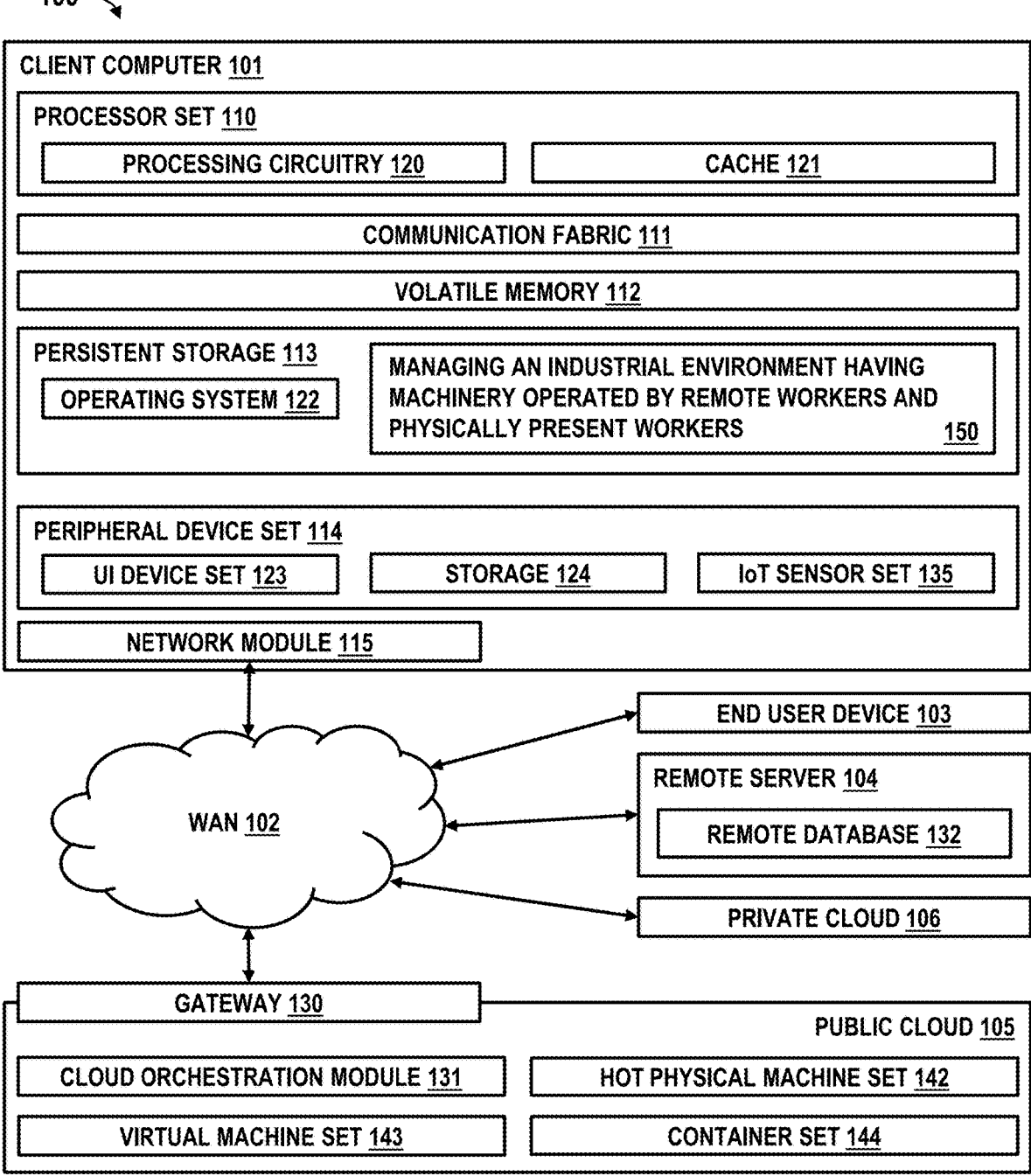

CLIENT COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

MANAGING AN INDUSTRIAL ENVIRONMENT HAVING MACHINERY OPERATED BY REMOTE WORKERS AND PHYSICALLY PRESENT WORKERS                150

PERIPHERAL DEVICE SET 114

UI DEVICE SET 123

STORAGE 124

IoT SENSOR SET 135

NETWORK MODULE 115

WAN 102

END USER DEVICE 103

REMOTE SERVER 104

REMOTE DATABASE 132

PRIVATE CLOUD 106

GATEWAY 130

PUBLIC CLOUD 105

CLOUD ORCHESTRATION MODULE 131

HOT PHYSICAL MACHINE SET 142

VIRTUAL MACHINE SET 143

CONTAINER SET 144

FIG. 1

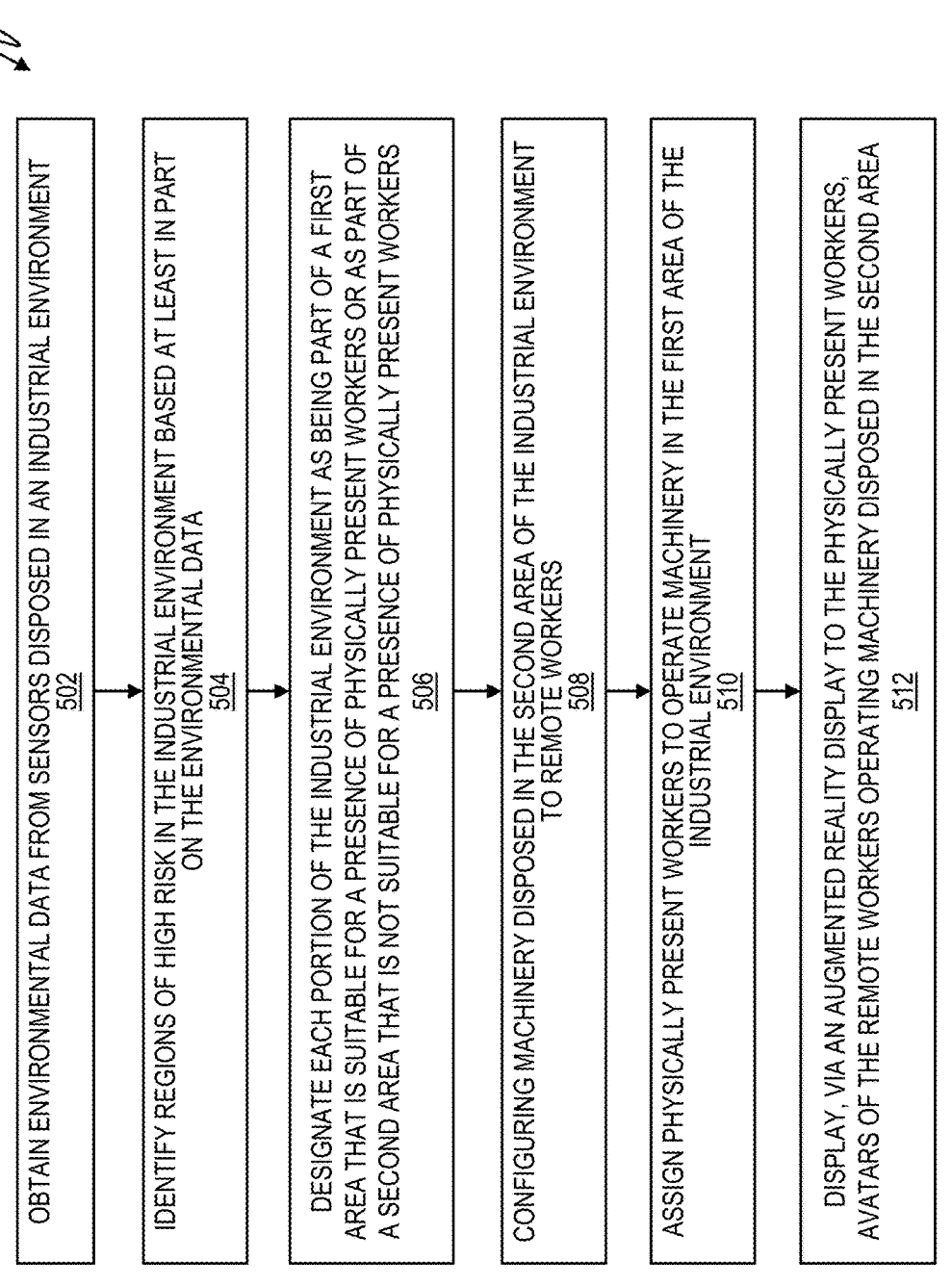

500

OBTAIN ENVIRONMENTAL DATA FROM SENSORS DISPOSED IN AN INDUSTRIAL ENVIRONMENT
502

IDENTIFY REGIONS OF HIGH RISK IN THE INDUSTRIAL ENVIRONMENT BASED AT LEAST IN PART ON THE ENVIRONMENTAL DATA
504

DESIGNATE EACH PORTION OF THE INDUSTRIAL ENVIRONMENT AS BEING PART OF A FIRST AREA THAT IS SUITABLE FOR A PRESENCE OF PHYSICALLY PRESENT WORKERS OR AS PART OF A SECOND AREA THAT IS NOT SUITABLE FOR A PRESENCE OF PHYSICALLY PRESENT WORKERS
506

CONFIGURING MACHINERY DISPOSED IN THE SECOND AREA OF THE INDUSTRIAL ENVIRONMENT TO REMOTE WORKERS
508

ASSIGN PHYSICALLY PRESENT WORKERS TO OPERATE MACHINERY IN THE FIRST AREA OF THE INDUSTRIAL ENVIRONMENT
510

DISPLAY, VIA AN AUGMENTED REALITY DISPLAY TO THE PHYSICALLY PRESENT WORKERS, AVATARS OF THE REMOTE WORKERS OPERATING MACHINERY DISPOSED IN THE SECOND AREA
512

FIG. 5

MANAGING AN INDUSTRIAL ENVIRONMENT HAVING MACHINERY OPERATED BY REMOTE WORKERS AND PHYSICALLY PRESENT WORKERS

BACKGROUND

The present disclosure generally relates to managing an industrial environment, and more specifically, to methods and systems for managing an industrial environment having machinery operated by remote workers and physically present workers.

In general, an industrial environment can include machinery that is operated by remote workers using virtual reality (VR) devices and machinery that is operated by physically present workers. VR devices create a simulated experience using three-dimensional displays to provide a user with an immersive feel of a virtual world. Applications of virtual reality include entertainment (such as watching movies or playing video games), education (such as medical or other training), and business (such as virtual meetings). Other types of VR-style technology include augmented reality (AR) and mixed reality, sometimes referred to as extended reality (XR).

Currently, VR systems use headsets or multi-projected environments to generate realistic images, sounds, and other sensations that simulate a user's physical presence in a virtual environment. A person using virtual reality equipment can look around the artificial world, move around in it, and interact with virtual features or items. Many VR systems use headsets that include a head-mounted display with a small screen in front of the eyes of a user, but VR systems can utilize specially designed rooms with multiple large screens. VR systems typically incorporate auditory and video feedback but may also allow other types of sensory and force feedback through haptic technology.

Using a VR system, a user can control a machine, such as a robot, that is located in an industrial environment that is remote from the user. An industrial environment may include risky areas, that are not safe for human presence, and non-risky areas, that are safe for human presence. At a given time, machinery located in a risky area needs to be operated and physically present workers are needed to be in non-risky areas adjacent to the risky area to accomplish an industrial task. In many cases, collaboration among the workers present both in risky areas and non-risky areas is desirable, so that the industrial task can be performed effectively.

SUMMARY

Embodiments of the present disclosure are directed to computer-implemented methods for managing an industrial environment having machinery operated by remote workers and physically present workers. According to an aspect, a computer-implemented method includes identifying a first area of the industrial environment suitable for a presence of physically present workers and identifying a second area of the industrial environment that is not suitable for the presence of physically present workers. The method also includes configuring machinery disposed in the second area of the industrial environment to be operated by remote workers and displaying, via an augmented reality display to the physically present workers, avatars of the remote workers operating machinery disposed in the second area.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 1 depicts a block diagram of an example computer system for use in conjunction with one or more embodiments of the present disclosure;

FIG. 5 depicts a flowchart of a method for managing an industrial environment having machinery operated by remote workers and physically present workers in accordance with one or more embodiments of the present disclosure.

DETAILED DESCRIPTION

Figure 2:
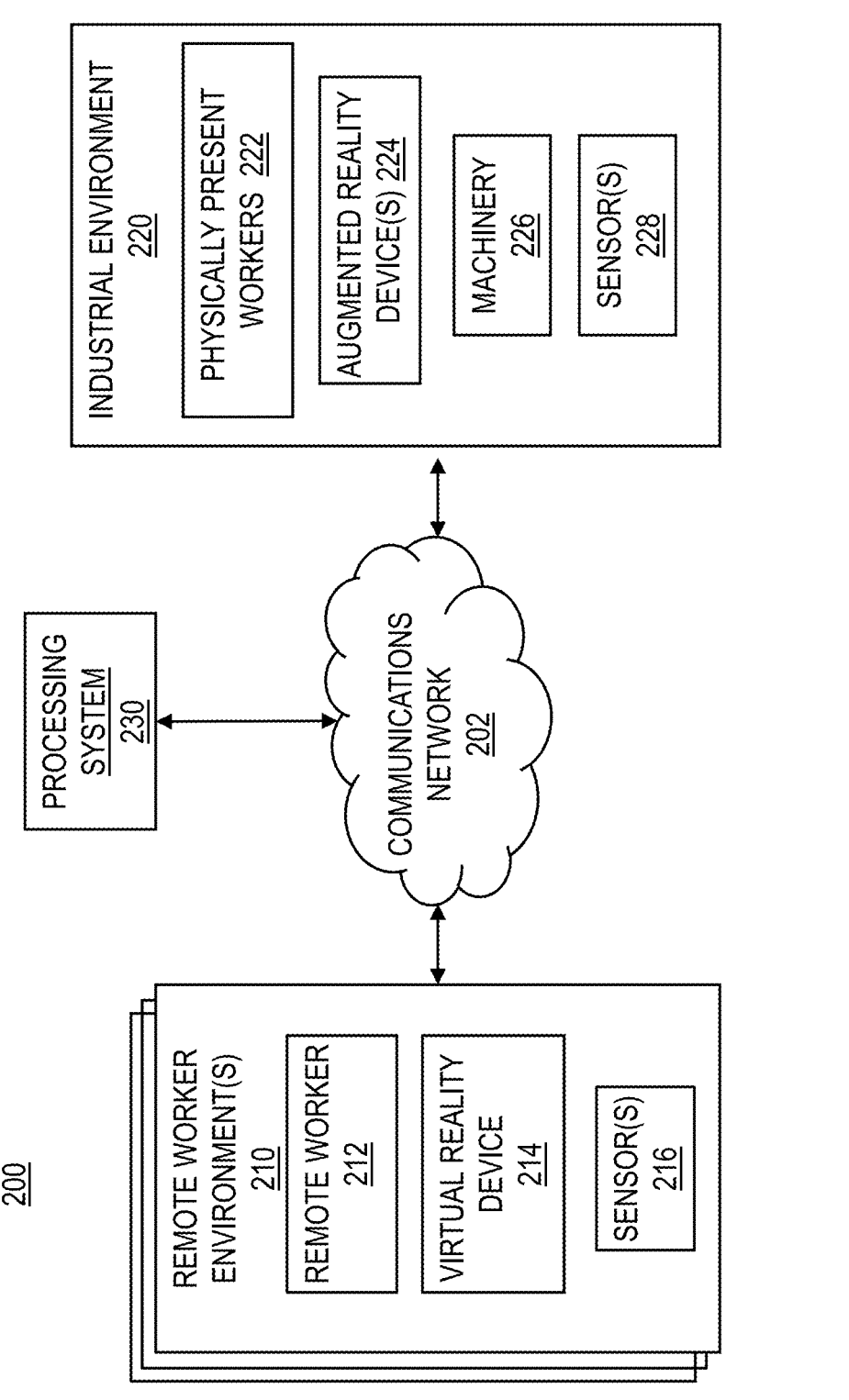
FIG. 2 depicts a block diagram of a system for managing an industrial environment having machinery operated by remote workers and physically present workers in accordance with one or more embodiments of the present disclosure.

As discussed above, collaboration among the workers physically present in an industrial environment and remote workers operating machinery disposed in the industrial environment is often desirable. For example, in industrial settings such as mining operations or oil/gas refinement there may be a mix of physically present workers and remote workers operating machinery. However, existing methods and techniques for supporting such collaboration are ineffective and inadequate. Disclosed herein is a system in which remote workers utilize virtual reality devices to operate machinery disposed in the industrial environment and workers physically present in the industrial environment utilize augmented reality devices to visualize the presence, and movements of, the remote workers.

Exemplary embodiments include methods, systems, and computer program products for managing an industrial environment having machinery operated by remote workers and physically present workers. In exemplary embodiments, environmental data from sensors disposed in an industrial environment is obtained and regions that have an increased risk of harm or injury to an individual in the industrial environment are identified based on the environmental data. The industrial environment is then divided into one or more first areas that are suitable for the presence of physically present workers and one or more second areas that are not suitable for the presence of physically present workers. As used herein, an area is determined to be suitable for the presence of physically present workers based on a determination that the risk of physical harm or injury to an individual in that area is below a threshold level. Likewise, an area is considered to not be suitable for the presence of physically present workers based on a determination that the risk of physical harm or injury to an individual in that area is above the threshold level. The machinery in the second area is assigned to remote workers for operation and machinery in the first area is assigned to physically present workers for operation. The physically present workers utilize augmented reality devices that display avatars of the remote workers operating machinery disposed in the second area. Remote workers utilize virtual reality devices to operate the machinery and to view the industrial environment.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as managing an industrial environment having machinery operated by remote workers and physically present workers 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Referring now to FIG. 2, a block diagram of a system 200 for managing an industrial environment having machinery operated by remote workers and physically present workers in accordance with one or more embodiments of the present disclosure is shown. As illustrated, the system 200 includes remote worker environments 210, an industrial environment 220, and a processing system 230 that are in communication with one another via a communications network 202. The communications network 202 may include a private network, a public network such as the Internet, or a combination thereof.

In exemplary embodiments, the industrial environment 220 includes one or more physically present workers 222 and machinery 226 such as robots that are capable of being remotely controlled and/or locally controlled by the physically present workers 222. In exemplary embodiments, one or more of the physically present workers 222 utilize augmented reality (AR) devices 224 to view the industrial environment 220. The augmented reality devices 224 are display devices that blend digital information with the industrial environment 220, enhancing the physically present workers 222 perception and interaction with the industrial environment 220. In exemplary embodiments, the augmented reality device 224 may be embodied in glasses or a headset that are worn by the physically present workers 222. The AR devices 224 use advanced sensors, cameras, and display technologies to overlay computer-generated graphics, information, or interactive elements onto the industrial environment 220. The augmented reality device 224 provides an immersive and enriched experience, allowing the physically present workers 222 to access contextual information, navigate spaces, visualize data, and engage in interactive applications, all while maintaining a connection to the industrial environment 220.

In exemplary embodiments, the machinery 226 includes one or more operational parameters, such as a movement path, an operational speed, and an operation direction, that can be controlled by a remote worker 212 or a physically present worker 222. The industrial environment 220 includes a plurality of sensors 228 that are configured to monitor one or more environmental conditions in various locations in the industrial environment 220. In exemplary embodiments, the sensors 228 include motion sensors, temperate sensors, gas detectors, and the like. The plurality of sensors 228 are dispersed throughout the industrial environment 220 and are configured to monitor the industrial environment 220 for conditions that may be harmful or hazardous to physically present workers 222, such as elevated temperatures, high levels of certain gases, or movement of machinery 226.

In exemplary embodiments, the data collected from the one or more of the sensors 228 is analyzed to determine the risk of physical harm or injury to an individual in an area. Based on the determined risk, the areas of the industrial environment 220 are classified as either suitable or not suitable for the presence of a physically present worker 222. The following are examples of data that can be collected from the one or more of the sensors 228 to determine the risk of physical harm or injury to an individual in an area. In one embodiment, one or more of the sensors 228 may be configured to identify structural defects in the industrial environment 220 such as cracks in the flooring, walls, or support beams can pose risks, especially if they indicate weakening or instability in the structure. In one embodiment, one or more of the sensors 228 may be configured to identify leaking gas, such as natural gas or other flammable gases, which can lead to fire or explosion hazards. In one embodiment, one or more of the sensors 228 may be configured to detect leaking steam from pipes or equipment can create both burn hazards and damage to machinery or infrastructure. In one embodiment, one or more of the sensors 228 may be configured to identify slippery Areas in the industrial environment 220, i.e., areas with spilled liquids, oils, or other slippery substances that can lead to slips and falls, which are common industrial accidents. In one embodiment, one or more of the sensors 228 may be configured to identify broken equipment or a chemical spill in the industrial environment 220. In one embodiment, one or more of the sensors 228 may be configured to identify electrical hazards, i.e., areas with exposed or damaged electrical components can be deadly due to electrocution risks. In one embodiment, one or more of the sensors 228 may be configured to identify noise pollution, i.e., areas with high noise levels can damage hearing and cause stress and fatigue. Identifying noisy areas and providing proper hearing protection is important. In one embodiment, one or more of the sensors 228 may be configured to identify fall hazard areas, i.e., elevated areas, such as platforms, walkways, and ladders, can be hazardous due to the risk of falls.

In exemplary embodiments, each of the remote worker environments 210 includes a remote worker 212, a virtual reality device 214, and sensors 216. The sensors 216 are configured to monitor the remote worker and the remote worker environment 210. In one embodiment, the sensors 216 are configured to measure the physical characteristics of the remote worker environment 210 and the position of the remote worker 212 within the remote worker environment 210. For example, the sensors 216 can measure the distance between the remote worker and walls, furniture, other people, or other objects disposed within the remote worker environment 210. In another embodiment, the sensors 216 are configured to measure characteristics of the remote worker 212. For example, the sensors 216 can measure biometric data of the remote worker 212, monitor the eye gaze of the remote worker 212, monitor the physical movements and gestures of the remote worker 212, and the like.

In exemplary embodiments, the virtual reality (VR) device 214 is one of a VR headset or multi-projected environment that is configured to generate realistic images, sounds, and other sensations to simulate the presence of the remote worker 212 in the industrial environment 220. The VR device 214 is further configured to present a digital twin of the machinery 226 in the industrial environment 220 and to capture the interaction between the remote worker 212 and the digital twin of the machinery 226. The VR device 214 transmits the captured interaction data between the remote worker 212 and the digital twin of the machinery 226 to the machinery 226 such that the remote worker is able to physically control the machinery 226 by interacting with the digital twin of the machinery 226 using the VR device 214. In addition, the VR device 214 is configured to display real-time video of the industrial environment 220, including the presence of physically present workers 222, to the remote worker 212.

In exemplary embodiments, the augmented reality device 224 is configured to display avatars of the remote workers 212 to that are operating machinery 226 in the industrial environment 220 to the physically present workers 222. In one embodiment, the avatars of the remote workers 212 that are presented to the physically present workers 222 are configured to mimic the detected movements and gestures made by the remote workers 212. In one embodiment, the AR device 224 is further configured to display a projected path, or projected movement, of a piece of machinery 226 to the physically present workers 222. The piece of machinery 226 whose projected path or movement is displayed may be controlled by a remote worker 210 or by another physically present worker 222.

In exemplary embodiments, the augmented reality device 224 is further configured to display artificial avatars, i.e., avatars that do not represent a remote worker 212, to the physically present workers 222. In one embodiment, the artificial avatars are signs that display safety information, such as a caution on slippery floor, hard hat area, or the like. In another embodiment, the artificial avatars are computer generated individuals that are making gestures to inform the physically present workers 222 of a particular risk or hazardous condition.

In exemplary embodiments, the processing system 230 is configured to manage the industrial environment 220 and the remote workers 212. In one embodiment, the processing system 230 is embodied in a computing environment 100, such as the one shown in FIG. 1. The processing system 230 is configured to receive data from the sensors 228 and to identify regions of the industrial environment 220 that have an elevated risk such that the presence of physically present workers 222 should be avoided. In one embodiment, the processing system 230 separates the industrial environment 220 into one or more first areas that are suitable for the presence of physically present workers and one or more second areas that are not suitable for the presence of physically present workers.

The processing system 230 is further configured to communicate with the virtual reality devices 214, the augmented reality devices, and the machinery 226. The processing system 230 is configured to obtain video of the industrial environment 220 that is presented to the remote workers 212 via the virtual reality devices 214. The processing system 230 is configured to facilitate the operation of machinery 226 by the remote worker via virtual reality devices 214. In one embodiment, based on the data received from the one or more sensors, the processing system 230 is configured to identify machinery 226 that should be operated by remote workers 212 via the virtual reality devices 214, i.e., machinery 226 that is disposed in one or more second areas that are not suitable for the presence of physically present workers.

Figure 3A:
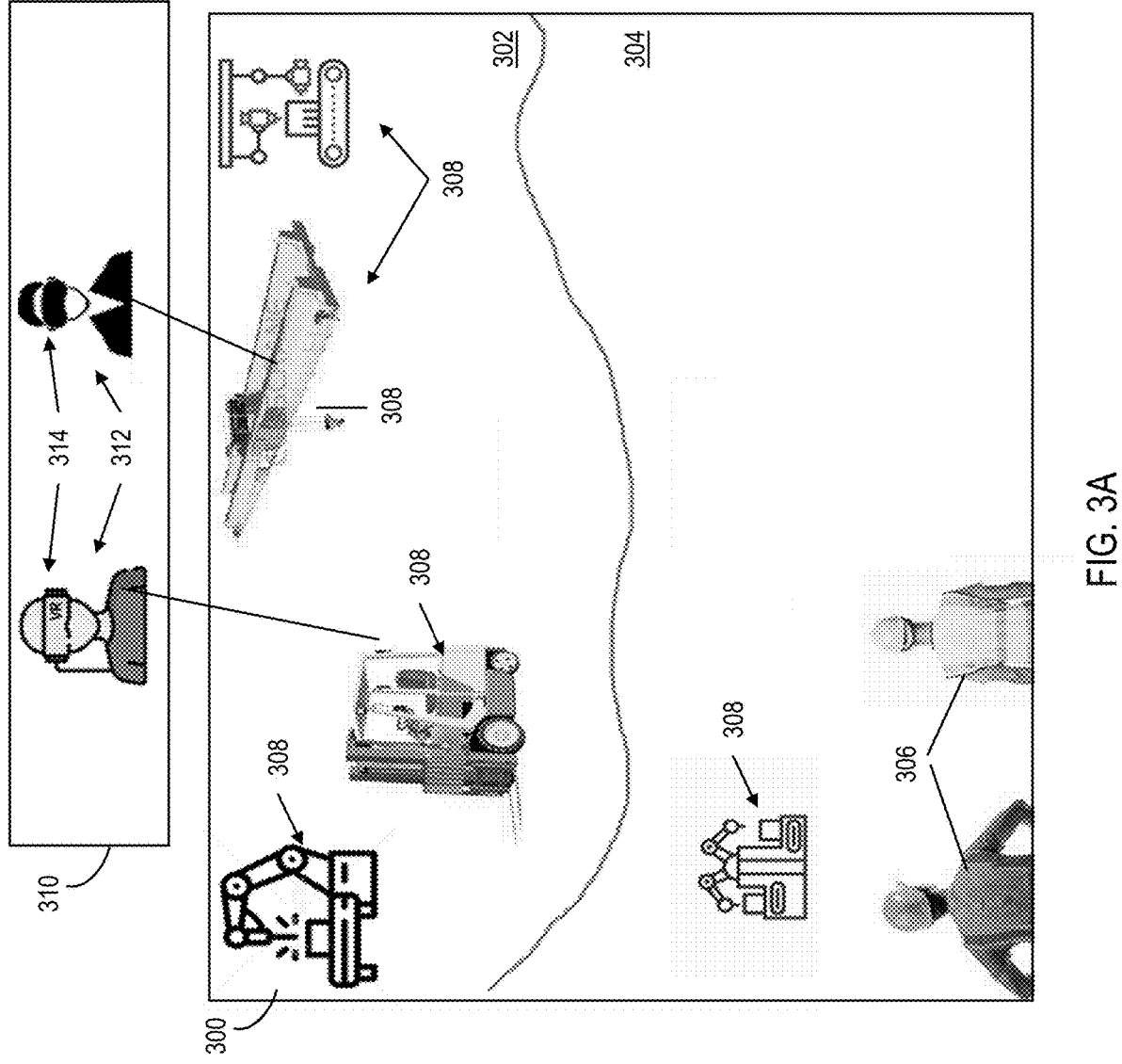
FIG. 3A depicts a schematic diagram of an industrial environment having machinery operated by remote workers and one or more physically present workers in accordance with one or more embodiments of the present disclosure.

Referring now to FIG. 3A, a schematic diagram of an industrial environment 300 having machinery operated by remote workers and one or more physically present workers in accordance with one or more embodiments of the present disclosure is shown. In exemplary embodiments, the industrial environment 300 includes a plurality of pieces of machinery 308 that may be controlled by a physically present worker 306 or by a remote worker 312. The remote workers 312 are located in a remote environment 310 and utilize a virtual reality device 314 to operate the machinery 308 and to view the industrial environment 300. In exemplary embodiments, the industrial environment 300 is separated into one or more first areas 304, which are areas that are suitable for the presence of physically present workers 306, and one or more second areas 302, which are areas that are not suitable for the presence of physically present workers.

Figure 3B:
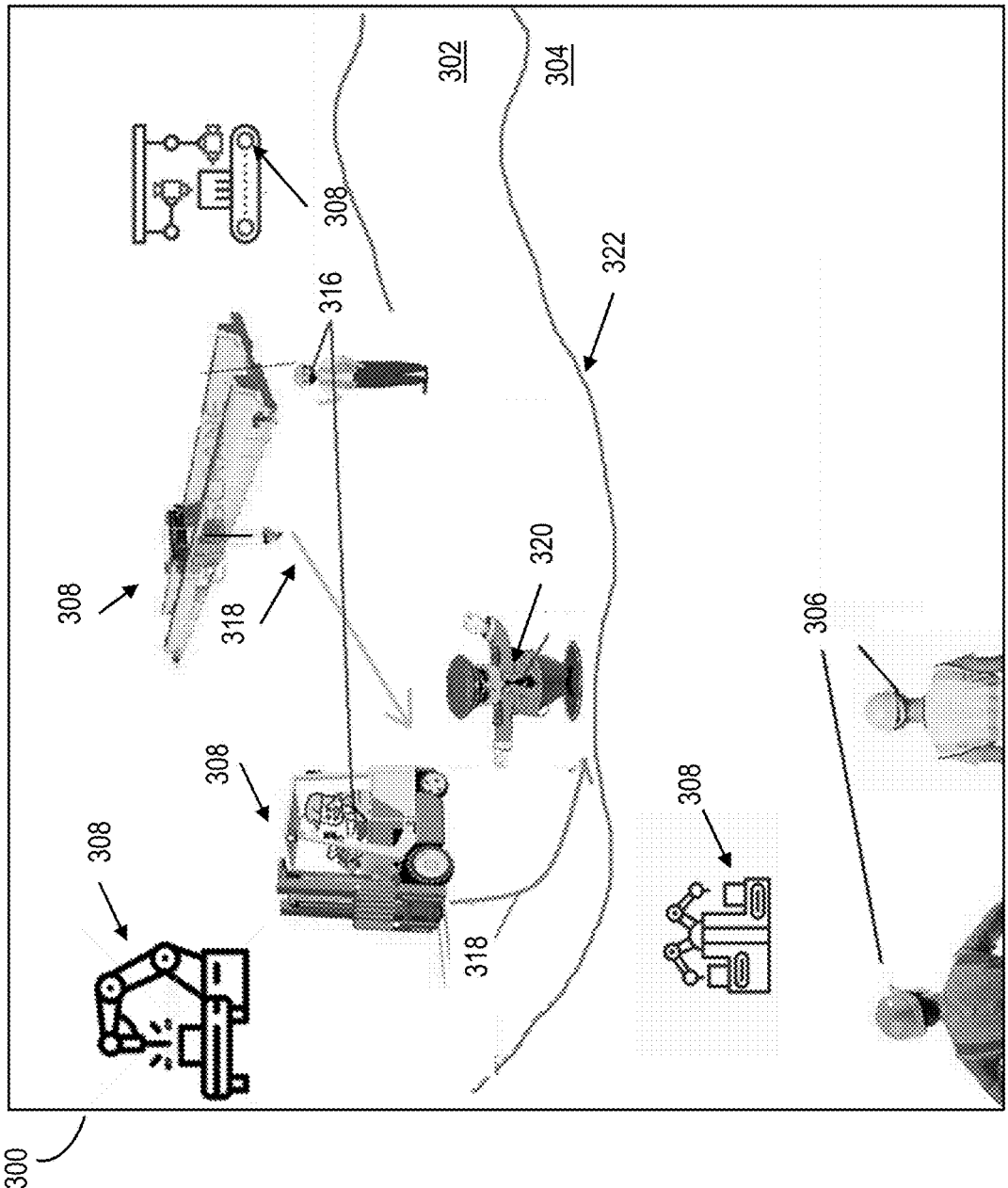
FIG. 3B depicts a schematic diagram of the industrial environment as seen by a physically present worker using an augmented reality device in accordance with one or more embodiments of the present disclosure.

Referring now to FIG. 3B, a schematic diagram of the industrial environment 300 as seen by a physically present worker 306 using an augmented reality device (not shown) in accordance with one or more embodiments of the present disclosure is shown. In exemplary embodiments, the industrial environment 300 includes a plurality of pieces of machinery 308 that may be controlled by a physically present worker 306 or by a remote worker 312. In exemplary embodiments, the displayed industrial environment 300 includes an avatar 316 of a remote worker who is remotely operating machinery 308. The avatar 316 is configured to mimic the movements and gestures of the remote worker that is operating machinery 308, such that the physically present worker 306 can collaborate with the remote worker. For example, the physically present worker 306 will be able to visualize the movements and gestures made by the remote worker that is remotely operating machinery 308 and will be able to predict the movements of the machinery 308.

In exemplary embodiments, the industrial environment 300 displayed to physically present worker 306 using an augmented reality device also includes a projected movement path 318 of the remotely operated machinery 308. In one example, the projected movement path 318 includes a graphic display of an arrow or line that illustrates the path the machinery 308 is expected to take. In exemplary embodiments, the projected movement path 318 is generated by the processing system based on input received from the remote worker and based on the movements of the remote worker.

In exemplary embodiments, the industrial environment 300 displayed to physically present worker 306 using an augmented reality device also includes an artificial avatar 320, i.e., avatars that do not represent a remote worker. In one embodiment, as shown in FIG. 3B, the artificial avatar 320 is a computer-generated individual that is performing a gesture to inform the physically present workers 306 of a particular risk or hazardous condition. In another embodiment, the artificial avatar 320 is a sign that displays safety information, such as a caution slippery floor, hard hat area, or the like. In exemplary embodiments, the industrial environment 300 displayed to physically present worker 306 using an augmented reality device also includes a border 322 between the first area 304 and the second area 302. In another embodiment, the flooring in part of, or the entire, the first area 304 may be displayed in a different color or with a pattern overlay to highlight the area of increased risk to the physically present worker 306.

Figures 4A, 4B:
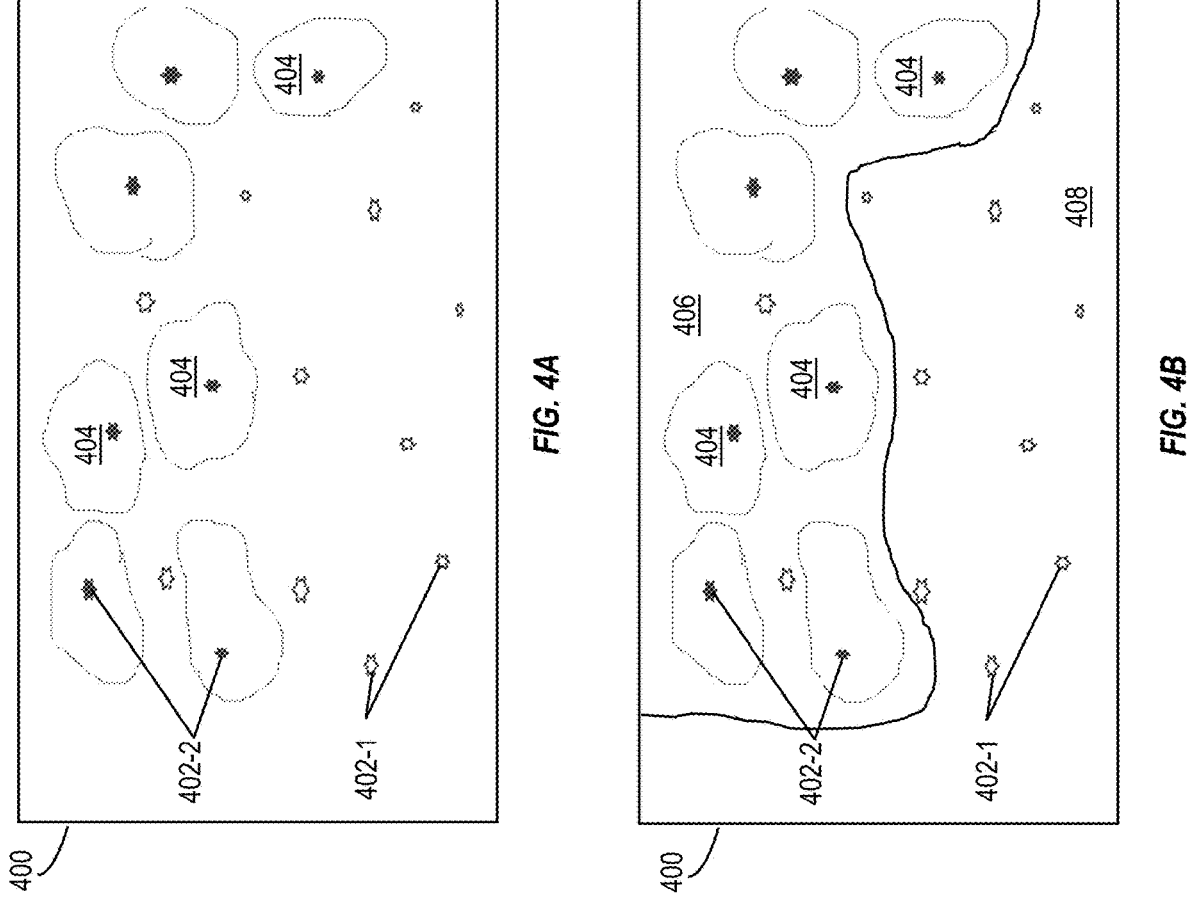
FIG. 4A depicts a schematic diagram of an industrial environment in accordance with one or more embodiments of the present disclosure.
FIG. 4B depicts a schematic diagram of the industrial environment of FIG. 4A that is divided into a first area and a second area in accordance with one or more embodiments of the present disclosure.

Referring now to FIGS. 4A and 4B, schematic diagrams of an industrial environment 400 in accordance with one or more embodiments of the present disclosure are shown. As illustrated, the industrial environment 400 includes a plurality of sensors 402 that are located throughout the industrial environment 400. The sensors 402 include sensors 402-1 that report conditions that are not harmful, i.e., temperatures and gas levels that are within a predefined range, to physically present workers in the industrial environment 400 and sensors 402-2 reporting conditions that are potentially harmful to physically present workers i.e., temperatures and gas levels that are outside a predefined range, in the industrial environment 400. In exemplary embodiments, based on the data received from the sensors 402-2 the processing system is configured to generate a high-risk area 404 around the sensor 402-2. In one embodiment, the size and dimensions of the high-risk area 404 around the sensor 402-2 are calculated based on data obtained from the sensors 402-2. For example, a sensor 402-2 that monitors temperature or gas levels may indicate that a temperature/gas level is outside of a defined threshold and the size and dimensions of the high-risk area 404 around the sensor 402-2 is determined based on the deviation from the monitored temperature/gas level from the defined threshold, e.g., a larger the deviation of the monitored temperature/gas level from the defined threshold will result in a larger the high-risk area 404 around the sensor 402-2.

In exemplary embodiments, as best shown in FIG. 4B, the industrial environment 400 is separated into a first area 408 which is suitable for the presence of physically present workers, and a second area 406 which is not suitable for the presence of physically present workers. In exemplary embodiments, the processing system 230 shown in FIG. 2 is configured to analyze the high-risk areas 404 around sensors 402-2 and to responsively separate the industrial environment 400 into first areas 408 and second areas 406. For example, the processing system 230 is configured to identify adjacent high-risk areas 404 and to merge them into a second area 406.

In exemplary embodiments, the collected data from the sensors 402 can include both visual and non-visual information. The collected data can include images, videos, environmental conditions, and other sensor readings. In exemplary embodiments, image analysis techniques, such as computer vision and machine learning algorithms, are used to analyze the visual data captured by the sensors 402, i.e., cameras. This analysis can involve object detection, recognition, tracking, and identifying hazardous conditions or high-risk areas 404 based on predefined criteria. In exemplary embodiments, a risk assessment model that takes into account various factors such as equipment movement patterns, equipment usage, environmental conditions, and historical safety records to combine the analyzed visual data with the non-visual sensor data to calculate the risk of harm or injury to an individual in each area of the industrial environment 400. The risk assessment model is configured to calculate the risk of harm or injury to an individual in each area based on the various factors such as equipment movement patterns, equipment usage, environmental conditions obtained from the sensor 402. In one embodiment, the risk assessment model is a machine learning model that was trained using historical safety records. The historical safety records include equipment movement patterns, equipment usage, environmental conditions, and reports of harm or injuries that occurred. The risk assessment model takes as input the current equipment movement patterns, equipment usage, and environmental conditions and outputs a risk assessment, i.e., a score that indicates a likelihood of harm or injury to an individual in an area of the industrial environment 400. The risk assessment is compared to a threshold level to determine whether an area of the industrial environment is determined to be a high-risk area 404. In exemplary embodiments, the data from the sensors 402 is provided to the processing system which will continuously monitor the sensor data and perform real-time analysis to calculate the risk of harm or injury to an individual in each area of the industrial environment 400. In addition, the processing system may generate alerts or notifications to relevant personnel when the calculated risk exceeds a threshold level, enabling immediate response and intervention.

Referring now to FIG. 5, a flowchart of a method 500 for managing an industrial environment having machinery operated by remote workers and physically present workers in accordance with one or more embodiments of the present disclosure is shown. In exemplary embodiments, the method 500 is performed by a processing system 230 such as the one shown in FIG. 2.

As shown at block 502, the method 500 includes obtaining environmental data from sensors disposed in an industrial environment. In exemplary embodiments, the sensors can include the plurality of sensors include motion sensors, temperate sensors, and gas detectors and the environmental data can include temperature levels, gas levels, movement of machinery, presence of hazardous materials, and the like. Next, as shown at block 504, the method 500 includes identifying regions of high risk in the industrial environment based at least in part on the environmental data. The method 500 further includes designating each portion of the industrial environment as being part of a first area that is suitable for the presence of physically present workers or as part of a second area that is not suitable for the presence of physically present workers, as shown at block 506.

Next, as shown at block 508, the method 500 includes configuring machinery disposed in the second area of the industrial environment to be operated by remote workers. The method 500 also includes assigning physically present workers to operate machinery in the first area of the industrial environment, as shown in block 510. The method 500 also includes displaying, via an augmented reality display to the physically present workers, avatars of the remote workers operating machinery disposed in the second area, as shown at block 512. In exemplary embodiments, the augmented reality display is disposed on a head mounted display device worn by the physically present workers. In exemplary embodiments, the avatars of the remote workers operating machinery are configured to emulate the movements of the remote workers operating machinery.

In exemplary embodiments, the method 500 may also include displaying, via the augmented reality display to the physically present workers, a projected movement path of the machinery disposed in the second area. The projected movement path of the machinery disposed in the second area is determined based on an analysis of one or more characteristics of the remote worker operating the machinery, where the one or more characteristics of the remote worker operating the machinery include eye movement of the remote worker, gestures made by the remote worker, and biometric data of the remote worker.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for managing an industrial environment having machinery operated by remote workers and physically present workers, the method comprising:

identifying a first area of the industrial environment suitable for a presence of physically present workers;

identifying a second area of the industrial environment that is not suitable for the presence of physically present workers;

configuring machinery disposed in the second area of the industrial environment to be operated by remote workers; and displaying, via an augmented reality display to the physically present workers, avatars of the remote workers operating machinery disposed in the second area.

2. The method of claim 1, further comprising displaying, via the augmented reality display to the physically present workers, a projected movement path of the machinery disposed in the second area.

3. The method of claim 2, wherein the projected movement path of the machinery disposed in the second area is determined based on an analysis of one or more characteristics of the remote worker operating the machinery.

4. The method of claim 3, wherein the one or more characteristics of the remote worker operating the machinery include eye movement of the remote worker, gestures made by the remote worker, and biometric data of the remote worker.

5. The method of claim 1, wherein the augmented reality display is disposed on a head mounted display device worn by the physically present workers.

6. The method of claim 1, wherein the industrial environment includes a plurality of sensors distributed across the industrial environment and wherein the identification of the first area and the second are determined based on data obtained from the plurality of sensors.

7. The method of claim 6, wherein the plurality of sensors include motion sensors, temperate sensors, and gas detectors.

8. The method of claim 1, wherein the avatars of the remote workers operating machinery are configured to emulate movements of the remote workers operating machinery.

9. A computing system having a memory having computer readable instructions and one or more processors for executing the computer readable instructions, the computer readable instructions controlling the one or more processors to perform operations comprising:

identifying a first area of an industrial environment suitable for a presence of physically present workers;

identifying a second area of the industrial environment that is not suitable for the presence of physically present workers;

configuring machinery disposed in the second area of the industrial environment to be operated by remote workers; and displaying, via an augmented reality display to the physically present workers, avatars of the remote workers operating machinery disposed in the second area.

10. The computing system of claim 9, wherein the operations further comprise displaying, via the augmented reality display to the physically present workers, a projected movement path of the machinery disposed in the second area.

11. The computing system of claim 10, wherein the projected movement path of the machinery disposed in the second area is determined based on an analysis of one or more characteristics of the remote worker operating the machinery.

12. The computing system of claim 11, wherein the one or more characteristics of the remote worker operating the machinery include eye movement of the remote worker, gestures made by the remote worker, and biometric data of the remote worker.

13. The computing system of claim 9, wherein the augmented reality display is disposed on a head mounted display device worn by the physically present workers.

14. The computing system of claim 9, wherein the industrial environment includes a plurality of sensors distributed across the industrial environment and wherein the identification of the first area and the second are determined based on data obtained from the plurality of sensors.

15. The computing system of claim 14, wherein the plurality of sensors include motion sensors, temperate sensors, and gas detectors.

16. The computing system of claim 9, wherein the avatars of the remote workers operating machinery are configured to emulate movements of the remote workers operating machinery.

17. A computer program product comprising a non-transitory computer readable storage medium having program instructions embodied therewith, the program instructions executable by a processor to cause the processor to perform operations comprising:

identifying a first area of an industrial environment suitable for a presence of physically present workers;

identifying a second area of the industrial environment that is not suitable for the presence of physically present workers;

configuring machinery disposed in the second area of the industrial environment to be operated by remote workers; and displaying, via an augmented reality display to the physically present workers, avatars of the remote workers operating machinery disposed in the second area.

18. The computing program product of claim 17, wherein the operations further comprise displaying, via the augmented reality display to the physically present workers, a projected movement path of the machinery disposed in the second area.

19. The computing program product of claim 18, wherein the projected movement path of the machinery disposed in the second area is determined based on an analysis of one or more characteristics of the remote worker operating the machinery.

20. The computing program product of claim 19, wherein the one or more characteristics of the remote worker operating the machinery include eye movement of the remote worker, gestures made by the remote worker, and biometric data of the remote worker.

* * * * *